(12) United States Patent
Weddle

(10) Patent No.: US 10,960,856 B1
(45) Date of Patent: Mar. 30, 2021

(54) AUTOMOBILE WITH INTEGRAL LIFTING JACKS

(71) Applicant: Kelly A. Weddle, Orlando, FL (US)

(72) Inventor: Kelly A. Weddle, Orlando, FL (US)

( * ) Notice: Subject to any disclaimer, the term of this patent is extended or adjusted under 35 U.S.C. 154(b) by 52 days.

(21) Appl. No.: 16/103,497

(22) Filed: Aug. 14, 2018

Related U.S. Application Data

(60) Provisional application No. 62/544,946, filed on Aug. 14, 2017.

(51) Int. Cl.
| | | |
|---|---|---|
| *B60S 9/00* | (2006.01) | |
| *B60S 9/12* | (2006.01) | |
| *B66F 3/46* | (2006.01) | |
| *B66F 3/44* | (2006.01) | |
| *B66F 3/28* | (2006.01) | |

(52) U.S. Cl.
CPC .................. *B60S 9/12* (2013.01); *B66F 3/44* (2013.01); *B66F 3/46* (2013.01); *B66F 3/28* (2013.01)

(58) Field of Classification Search
None
See application file for complete search history.

(56) References Cited

U.S. PATENT DOCUMENTS

| | | | |
|---|---|---|---|
| 4,993,688 A | 2/1991 | Mueller et al. | |
| 5,219,429 A | 6/1993 | Shelton | |
| 5,224,688 A | 7/1993 | Torres et al. | |
| 5,377,957 A | 1/1995 | Mosley | |
| 5,722,641 A * | 3/1998 | Martin | B60S 9/12 254/423 |
| 6,079,742 A * | 6/2000 | Spence | B25B 21/002 254/423 |
| 6,910,680 B1* | 6/2005 | Geller | B60S 9/12 254/418 |
| 6,991,221 B1 | 1/2006 | Rodriguez | |
| 9,126,568 B1 | 9/2015 | Reid, Jr. | |
| 2007/0013537 A1 | 1/2007 | Jones et al. | |
| 2013/0049977 A1* | 2/2013 | Finkbeiner | B66F 7/28 340/686.1 |
| 2014/0217342 A1 | 8/2014 | Dondurur et al. | |
| 2014/0231732 A1* | 8/2014 | Piuian | B60S 9/12 254/423 |

\* cited by examiner

*Primary Examiner* — Brian D Keller
(74) *Attorney, Agent, or Firm* — Cramer Patent & Design, PLLC; Aaron R. Cramer

(57) ABSTRACT

An automobile includes a plurality of frame-integrated hydraulic jacks includes a trunk mounted control panel in electrical communication with a power source and a plurality of jacks each being located beneath the automobile frame adjacent each wheel of the automobile. A plurality of flashing illumination is disposed upon the base of each jack and are in electrical communication with the control panel. The control panel permits a user to selectively raise or lower the automobile by the actuation of the plurality of jacks.

1 Claim, 5 Drawing Sheets

AUTOMOBILE WITH INTEGRAL LIFTING JACKS

RELATED APPLICATIONS

The present invention was first described in and claims the benefit of U.S. Provisional Patent Application No. 62/544,946 filed on Aug. 14, 2017, the entire disclosures of which are incorporated herein by reference.

FIELD OF THE INVENTION

The present invention relates generally to the field of automobile frames having integrated illuminated hydraulic jacks.

BACKGROUND OF THE INVENTION

Over the course of a lifetime, almost every automobile will get at least one (1) flat or punctured tire. Quite often, fixing this situation usually involves accessing the underside of the automobile or lifting the vehicle in order to remove the flat tire, all the while performing this work along the side of a potentially busy road or highway. Usually this task is accomplished via assistance of a car jack which is included with most vehicles. The use of the jack typically involves the use of physical exertion through a lever or screw system to develop the power necessary to raise the vehicle to a height sufficient to remove the damaged tire and replace it with a spare or new tire.

Sometimes, the physical exertion required to operate the automobile's jack is beyond that which the operator of the automobile is capable. In those situations, the service of a tow truck is required to perform the necessary repairs or to tow the automobile somewhere where the proper equipment and maintenance personnel are available. Additionally, should the tire changing occur at night, the individual performing the tire changing task runs the serious risk of being hit by another automobile due to low or no viability. Likewise, depending upon the location of the stranded automobile, it may pose a significant road hazard to other motorists who may not see the stranded automobile in sufficient time to stop and avoid a collision. Such collisions are more than capable of producing significant property damage, injury or even death.

Many efforts have been made to address this problem such as U.S. Pat. No. 6,991,221, U.S. Pat. App. Pub. No. 2014/0217342, U.S. Pat. App. Pub. No. 2007/0013537 and U.S. Pat. No. 9,126,568. However, these devices are unsatisfactory in both desired effect and ease of operation. Accordingly, there exists a need for a means by which a damaged tire or tires can be removed and replaced at any roadside location, without the use of physical exertion, while illuminating the vehicle being changed. The development of the automobile with frame with integrated illuminated hydraulic jacks fulfills this need.

SUMMARY OF THE INVENTION

In view of the foregoing disadvantages inherent in the prior art, it has been observed that there is need for an automobile frames having integrated illuminated hydraulic jacks To achieve the above and other objectives, the present invention provides for an automotive frame comprising a first jack which is attached to and located adjacent a first wheel well, a second jack which is attached to and located adjacent a second wheel well, a third jack which is attached to and located adjacent a third wheel well, a fourth jack which is attached to and located adjacent a fourth wheel well and a control module which has a control panel disposed upon an upper face in electrical communication with the control module. The first jack, the second jack, the third jack, and the fourth jack each have an illumination means for illuminating a general area around a respective jack. The control module is in electrical communication with a power source and each illumination means. The control panel permits a user to selectively activate or deactivate the first jack, the second jack, the third jack and the fourth jack thereby raising or lowering the automobile frame. In a separate embodiment the automotive frame may be in independent hydraulic communication with each jack.

Each jack comprises a mounting plate, a cylinder which is secured beneath the mounting plate, a piston in hydraulic communication with the cylinder with the piston projecting from within an underside of the cylinder, a jack base support secured to a distal end of the piston and a first jack base secured on an upper surface to the first jack base support. The first jack cylinder is in hydraulic communication with the control module.

The illumination means of each jack further comprises a plurality of illumination devices disposed about an upper face perimeter edge of each jack base. The illumination devices are in electrical communication with the control module. The illumination devices comprise a plurality of light emitting diodes. Each illumination device of the first jack, the second jack, the third jack and the fourth jack may comprise a plurality of light emitting diodes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
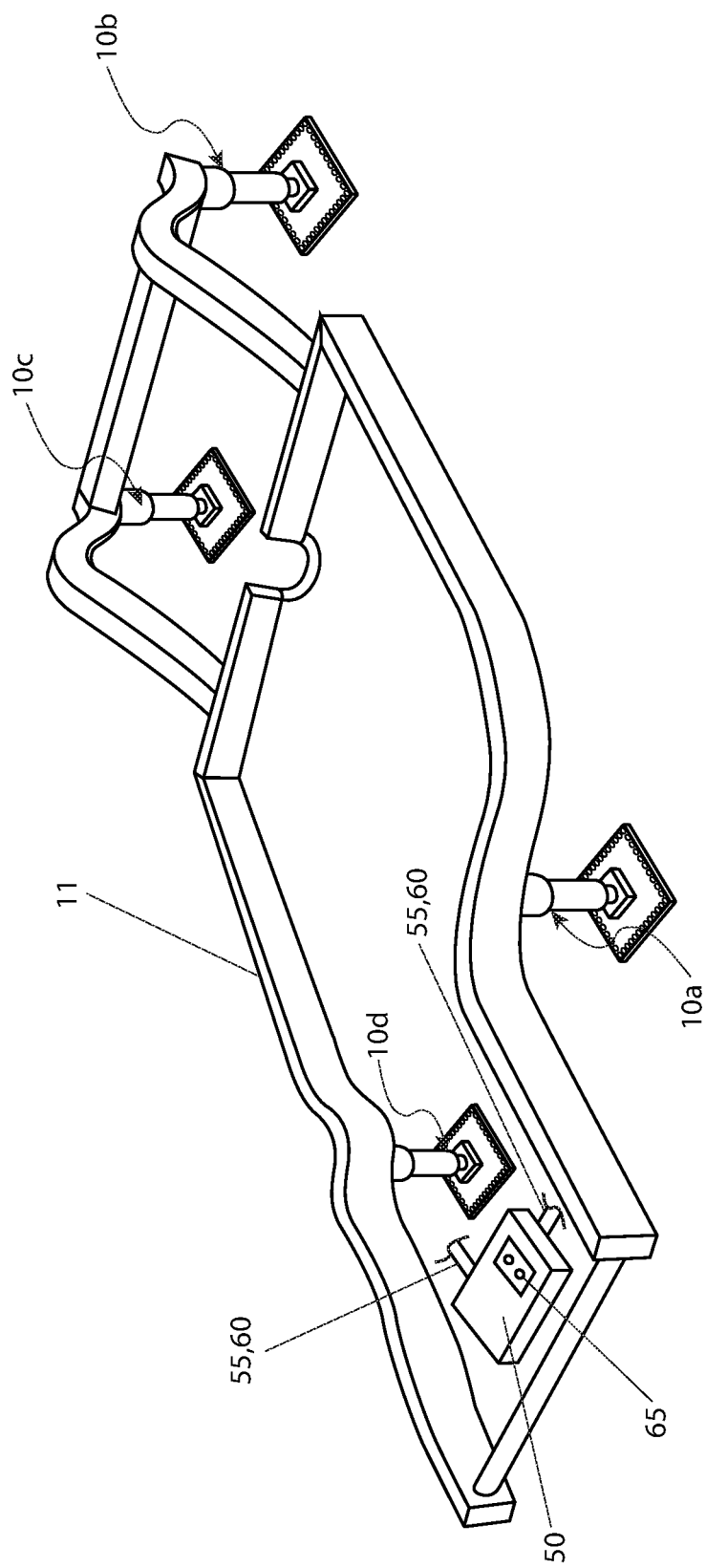
FIG. 1 is a perspective front top view of an automobile frame 11 with integrated illuminated hydraulic jacks 10*a*, 10*b*, 10*c*, 10*d* according to a preferred embodiment of the present invention.

10*a* first jack
10*b* second jack
10*c* third jack
10*d* fourth jack
11 automobile frame
15 main cylinder 20 piston
25 base
30 illumination units
35 base support
40 mounting plate
45 mounting plate apertures
50 control module
55 hydraulic line
60 electrical wire
65 control panel
70 hydraulic extend hose
75 hydraulic retract hose
80 aperture
85 hydraulic system
90 internal motor
95 hydraulic pump
100 hydraulic reservoir
105 main power switch
110 extend pushbuttons
115 retract pushbuttons
120 extend all pushbutton
125 retract all pushbutton
130 power on indicator
135 jacks down indicator
140 safety illumination light power switch
145 safety illumination light mode switch
150 illuminating bar

DESCRIPTION OF THE INVENTION

The best mode for carrying out the invention is presented in terms of its preferred embodiment, herein depicted within FIGS. 1-5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

1. Detailed Description of the Figures

Referring now to FIG. 1, a perspective front top view of an automobile frame 11 with integrated illuminated hydraulic jacks 10a, 10b, 10c, 10d (hereinafter referred to as jacks or jack) according to a preferred embodiment of the present invention is disclosed. Each jack 10a, 10b, 10c, 10d is secured to an underside portion of an automobile frame 11 behind an individual wheel well. Each jack 10a, 10b, 10c, 10d is in hydraulic communication with a common control module 50 having a hydraulic pump (not shown) by a plurality of hydraulic lines 55. The control module 50 is also in electrical communication with a power source such as the automobile battery (not shown). The control module 50 may be secured within the trunk of an automobile (not shown) or any other place which provides access by a user to the control module 50. Disposed upon a top face of the control module 50 is a control panel 65. The control panel 65 is in electrical communication with the control module 50 and enables the user to activate or deactivate the jacks 10a, 10b, 10c, 10d simultaneously or individually. The control panel 65 utilizes switches that can be manual or integrated into a touch screen panel.

Figure 2:
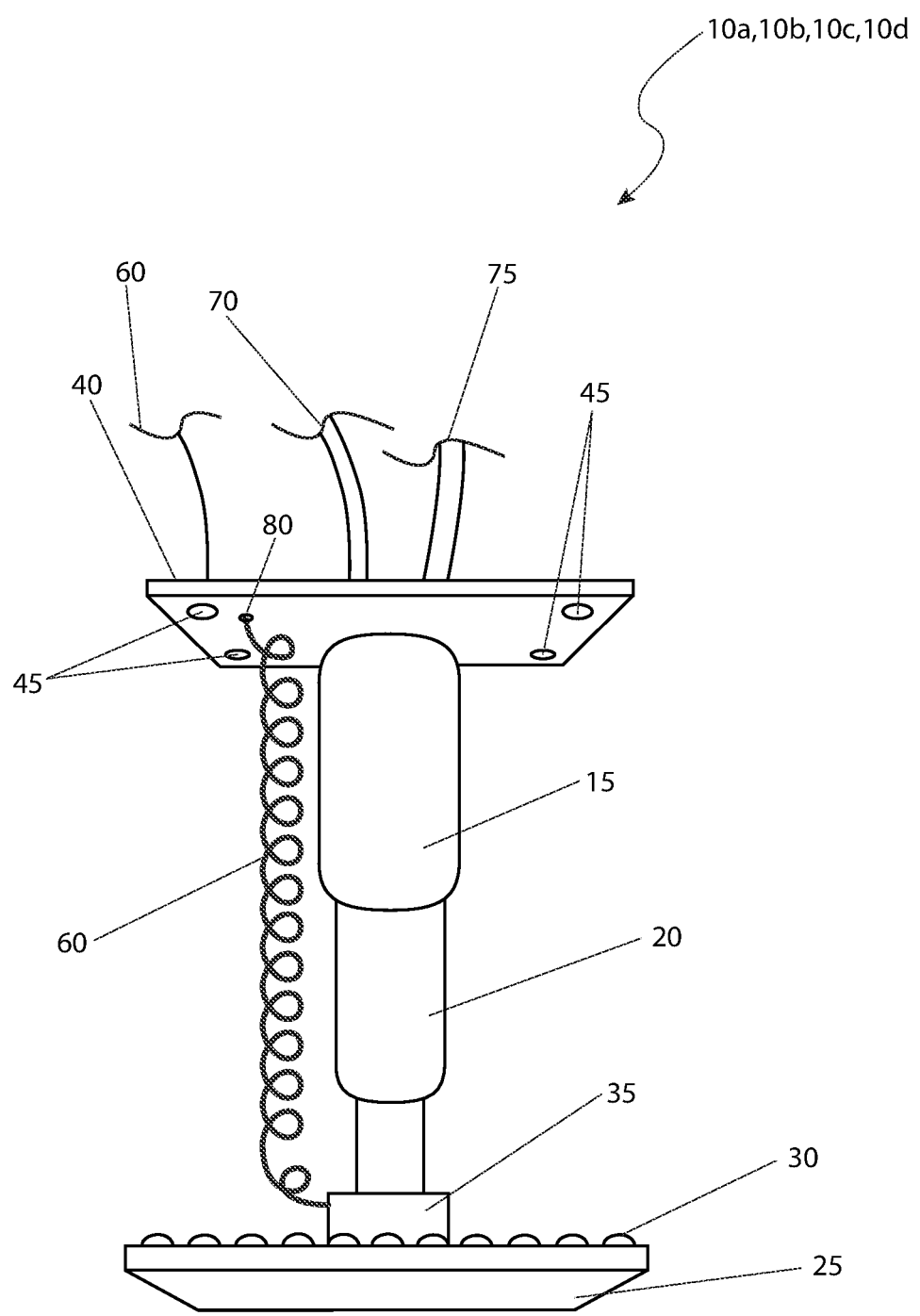
FIG. 2 is a front view of an individual illuminated hydraulic jack 10*a*, 10*b*, 10*c* or 10*d* according to a preferred embodiment of the present invention.

Referring now to FIG. 2, a front view of an individual jack 10a, 10b, 10c, 10d according to a preferred embodiment of the present invention is disclosed. Each jack 10a, 10b, 10c, 10d comprises a metallic polygonal planar base 25 having a plurality of illumination units 30 disposed upon an upper surface perimeter edge of the base 25. Secured to a center portion of the base 25 is a base support 35 which secures a piston 20. The piston 20 is in mechanical communication with a main cylinder 15 disposed above the piston 20. The upper surface of the main cylinder is secured beneath a metallic polygonal planar mounting plate 40. The mounting plate 40 has a plurality of mounting plate apertures 45 disposed through the mounting plate 40, capable of receiving fasteners for fastening the mounting plate 40 to the automobile frame 11. Each mounting plate 40 of each jack 10a, 10b, 10c, 10d may be bolted to an underside portion of the automobile frame 11 through the plurality of mounting plate apertures 45 or welded to the underside portion of the automobile frame 11 utilizing welding methods commonly employed in the automobile repair or welding industries.

A hydraulic extend hose 70 and a hydraulic retract hose 75 are in hydraulic communication with the main cylinder 15 through an aperture (not shown) in the mounting plate 40. An electrical line 60, self-coiling in nature, is in electrical communication with the plurality of illumination units 30 through an aperture 80 in the mounting plate 40.

Figure 3:
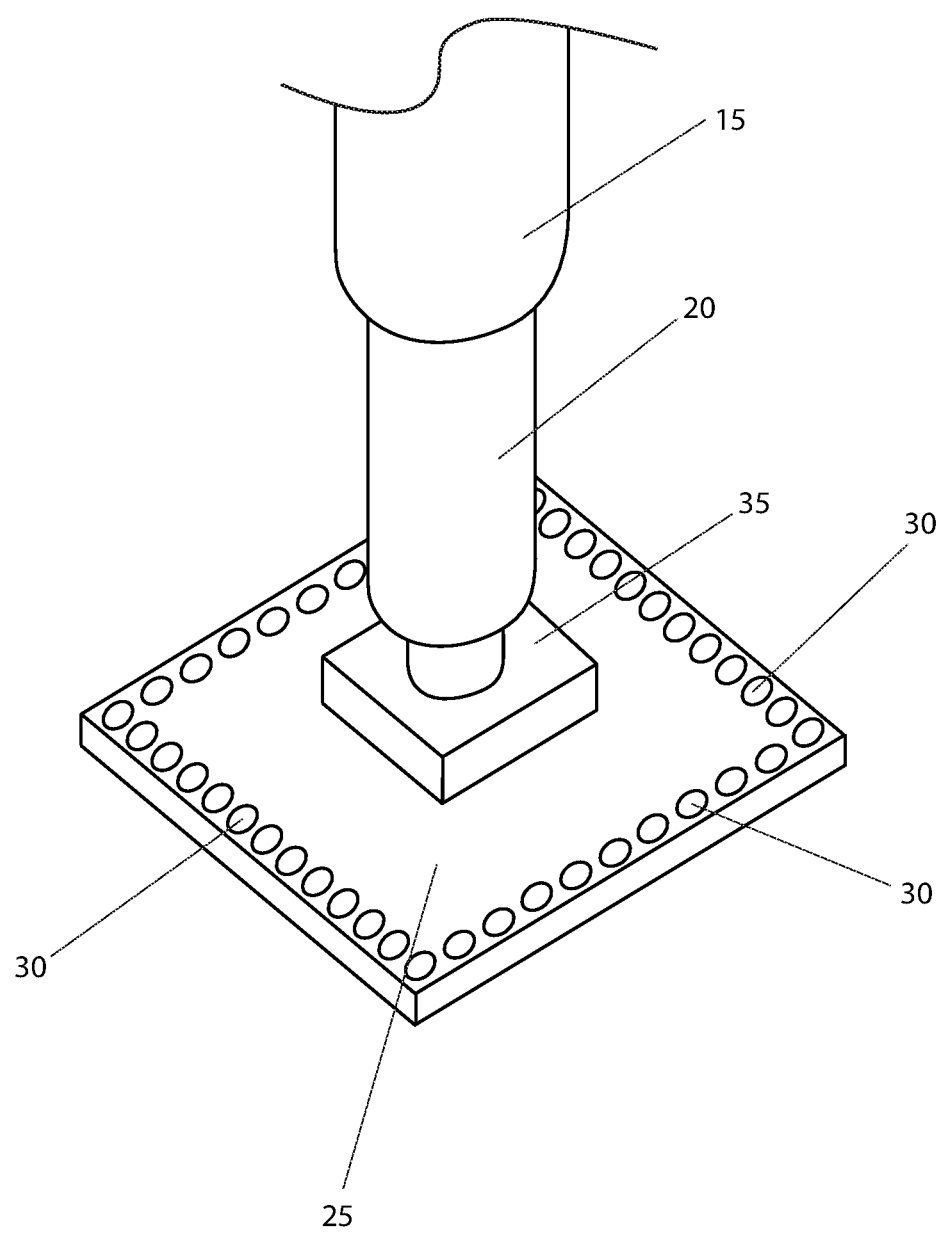
FIG. 3 is a perspective front top view of a lower portion of an individual illuminated hydraulic jack 10*a*, 10*b*, 10*c* or 10*d* showing a base 25 having a plurality of illumination units.

Referring now to FIG. 3, a perspective front top view of a lower portion of an individual illuminated hydraulic jack 10a, 10b, 10c or 10d showing a base 25 having a plurality of illumination units according to a preferred embodiment of the present invention is disclosed. The main cylinder 15, piston 20, and base support 35 are shown secured above the base 25 which in turn has a plurality of illumination units 30 which are disposed upon an entire upper surface perimeter edge of the base 25.

Figure 4:
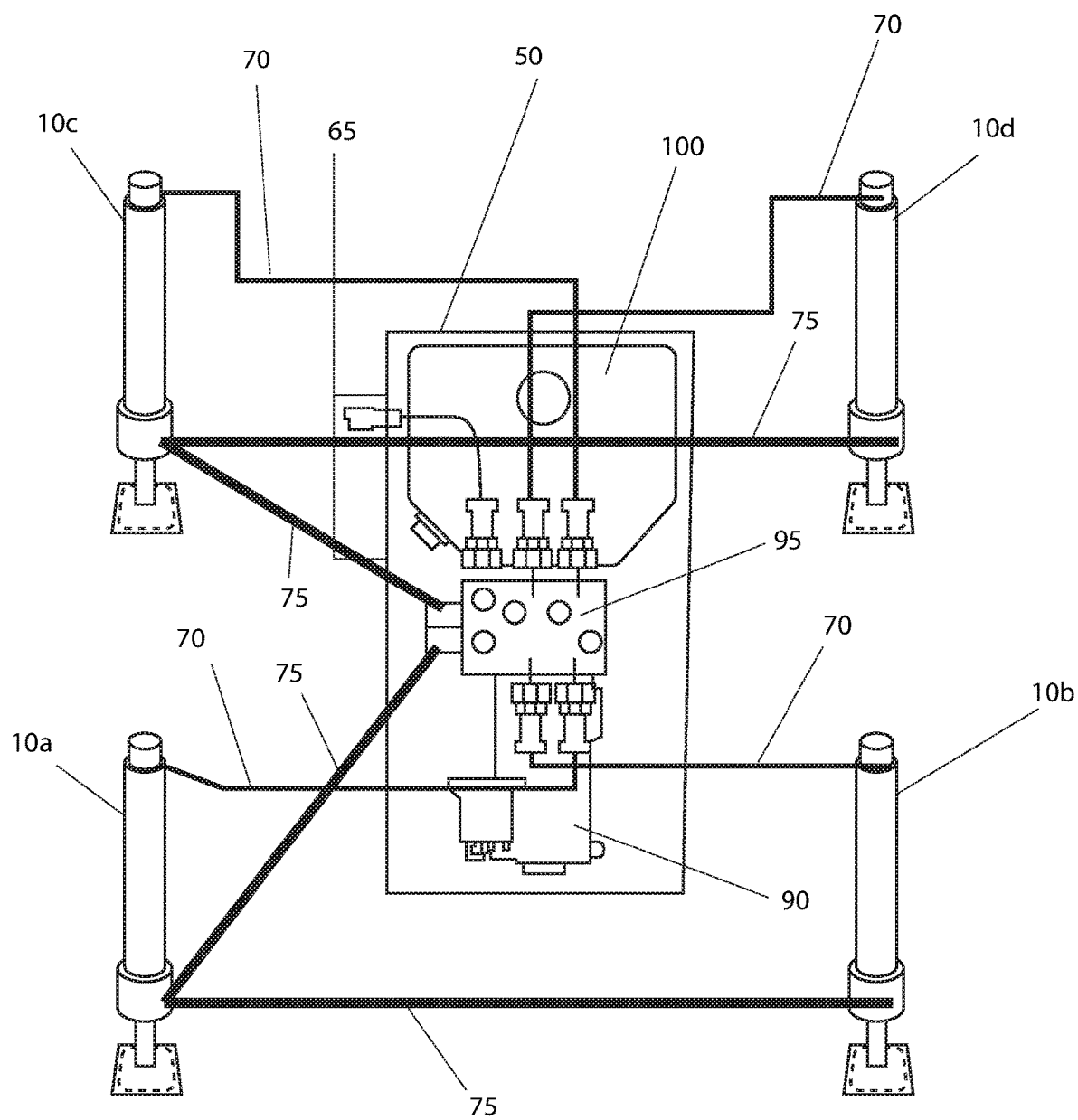
FIG. 4 is a pictorial representation of the hydraulic system 85 as used with an automobile frame 11 with integrated illuminated hydraulic jacks 10*a*, 10*b*, 10*c*, 10*d*, according to the preferred embodiment of the present invention; and, FIG. 5 is a front view of the control panel 65, as used with an automobile frame 11 with integrated illuminated hydraulic jacks 10*a*, 10*b*, 10*c*, 10*d*, according to the preferred embodiment of the present invention.

Referring next to FIG. 4, a pictorial representation of the hydraulic system 85 as used with an automobile frame 11 with integrated illuminated hydraulic jacks 10a, 10b, 10c, 10d, according to the preferred embodiment of the present invention is depicted. The control module 50 with the control panel 65 comprises an internal motor 90, a hydraulic pump 95 and a hydraulic reservoir 100. Multiple hydraulic extend hose 70 and hydraulic retract hose 75 are used to interconnect the hydraulic jack 10a, 10b, 10c, and 10d, to the hydraulic pump 95 in a combination of series and parallel interconnection loops. It is noted that the interconnection pattern shown is for illustrative purposes only and is not intended to represent the sole means of interconnection. Other patterns may also work equally well and as such, the depicted pattern is not intended to limit the present invention.

Figure 5:
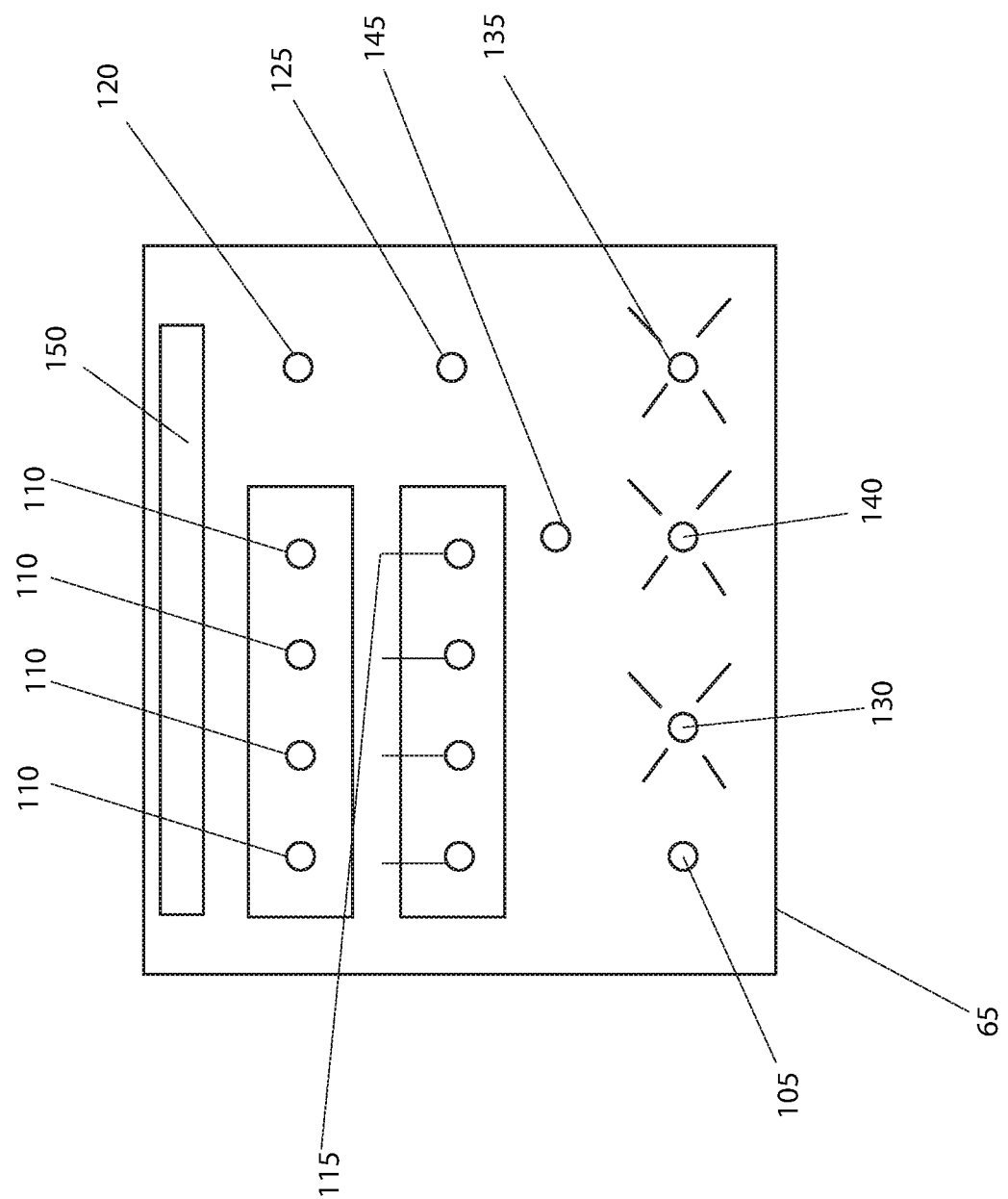

Referring finally to FIG. 5, a front view of the control panel 65, as used with an automobile frame 11 with integrated illuminated hydraulic jacks 10a, 10b, 10c, 10d, according to the preferred embodiment of the present invention is shown. The control panel 65 would be located in close proximity to the control module 50 (as shown in FIG. 1), and would preferably be close to the spare tire, lug wrench, and other aids useful when changing a tire on a motor vehicle. The control panel 65 is provided with a main power switch 105 used to provide main power to the internal motor 90 (as shown in FIG. 4). A bank of extend pushbuttons 110 and a bank of retract pushbuttons 115, for the hydraulic jack 10a, 10b, 10c, and 10d respectively is provided. An extend all pushbuttons 120 as well as a retract all pushbutton 125 is also provided for simultaneous extension and retraction respectively as well. A power on indicator 130 is provided to indicate operation of the invention to the user. Likewise, a jacks down indicator 135 prominently positioned would provide the user of a "JACKS DOWN" situation to prevent driving away with any one of the hydraulic jacks 10a, 10b, 10c, and/or 10d in a deployed position. Finally, a safety illumination light power switch 140 and a safety illumination light mode switch 145 is provided for actuation and lighting mode control of the illumination units 30 (as shown in FIGS. 2 and 3).

In certain embodiments, an illuminating bar 150 can be disposed along an upper edge of the control panel 65 to provide illumination to the general vicinity of where the control panel 65 is located, such as a trunk of the automobile that the jacks 10a, 10b, 10c, 10d are implemented with. Such an illuminating bar 150 can be activated continuously, or when the trunk is open or activated by motion sensors. Additionally, other types of illumination can be achieved similar to the illumination bar 150. These other types can be back lighting, auxiliary lighting, or the like.

It is also envisioned that various sensors can be implemented with each jack 10a, 10b, 10c, 10d in order to communicate a fail of the particular jack. Such a fail can be slipping, loss of power, loss of hydraulic fluid, or other similar catastrophic failures than can be communicated to the control panel 65 or rendered with an audible alarm.

2. Manufacture and Utilization of the Preferred Embodiment

The preferred embodiment of the present invention can be utilized by the common user in a simple and effortless manner with little or no training. It is envisioned that the jacks 10a, 10b, 10c, 10d and control module 50 would be installed in general accordance with FIG. 1 through FIG. 5. The user would procure the automobile frame 11 with integrated illuminated hydraulic jacks 10a, 10b, 10c, 10d while paying particular attention to vehicle size, vehicle weight, lift height and other parameters. Due to the tight integration of the invention with other electrical and mechanical systems as found on modern day automobiles, the present invention would most likely be incorporated as standard or optional equipment on new motor vehicles. However, it is also envisioned the present invention could be incorporated as an aftermarket add-on component for existing motor vehicles as well.

During utilization of the automobile frame 11 with integrated illuminated hydraulic jacks 10a, 10b, 10c, 10d, the following procedure would be initiated: the vehicle would be parked on a level surface; the parking brake engaged, any non-raised wheels would be chocked; any persons removed from the vicinity of the vehicle for safety; the main power switch 105 would be toggled on; the safety illumination light power switch 140 and the safety illumination light mode switch 145 activated if required during nighttime usage or emergency roadside use; the either the respective extend pushbuttons 110 or the extend all pushbuttons 120 would be pressed and held until the respective tire or tires raised to the needed height; and the tire replacement or undercarriage repair would proceed following conventional practices.

After use, all of the hydraulic jacks 10a, 10b, 10c, 10d, the following procedure would be initiated: all unnecessary personnel would be removed from the general area for safety, the respective retract pushbuttons 115 or retract all pushbutton 125 would be pressed and held until the jacks down indicator 135 is no longer illuminated; the safety illumination light power switch 140 would be toggled off; and the main power switch 105 would be toggled off. Should future usage of the automobile frame 11 with integrated illuminated hydraulic jacks 10a, 10b, 10c, 10d be required, the above process would be repeated in a cyclical manner as needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An automobile frame, consisting of:
a first jack attached to and located adjacent a first wheel well;
a second jack attached to and located adjacent a second wheel well;
a third jack attached to and located adjacent a third wheel well;
a fourth jack attached to and located adjacent a fourth wheel well; and
a control module having a control panel disposed upon an upper face of the control module in electrical communication with said control module;
wherein said first jack, said second jack, said third jack, and said fourth jack each have an illumination means for illuminating a general area around a respective jack;
wherein said control module is in electrical communication with a power source and each illumination means;
wherein said control module is in independent hydraulic communication with said first jack, said second jack, said third jack and said fourth jack; and
wherein said control panel permits a user to selectively activate or deactivate said first jack, said second jack, said third jack and said fourth jack thereby raising or lowering said automobile frame;
wherein said first jack comprises:
a first jack mounting plate;
a first jack cylinder secured beneath said first jack mounting plate;
a first jack piston in hydraulic communication with said first jack cylinder, said first jack piston projecting from within an underside of said first jack cylinder;
a first jack base support secured to a distal end of said first jack piston; and
a first jack base secured on an upper surface to said first jack base support;
wherein said first jack cylinder is in hydraulic communication with said control module;
wherein said second jack comprises:
a second jack mounting plate;
a second jack cylinder secured beneath said second jack mounting plate;
a second jack piston in hydraulic communication with said second jack cylinder, said second jack piston projecting from within an underside of said second jack cylinder;
a second jack base support secured to a distal end of said second jack piston; and
a second jack base secured on an upper surface to said second jack base support;
wherein said second jack cylinder is in hydraulic communication with said control module;

wherein said third jack comprises:
- a third jack mounting plate;
- a third jack cylinder secured beneath said third jack mounting plate;
- a third jack piston in hydraulic communication with said third jack cylinder, said third jack piston projecting from within an underside of said third jack cylinder;
- a third jack base support secured to a distal end of said third jack piston; and
- a third jack base secured on an upper surface to said third jack base support;

wherein said third jack cylinder is in hydraulic communication with said control module;

wherein said fourth jack comprises:
- a fourth jack mounting plate;
- a fourth jack cylinder secured beneath said fourth jack mounting plate;
- a fourth jack piston in hydraulic communication with said fourth jack cylinder, said fourth jack piston projecting from within an underside of said fourth jack cylinder;
- a fourth jack base support secured to a distal end of said fourth jack piston; and
- a fourth jack base secured on an upper surface to said fourth jack base support;

wherein said fourth jack cylinder is in hydraulic communication with said control module;

wherein said illumination means of said first jack further comprises a plurality of illumination devices disposed about an upper face perimeter edge of said first jack base;

wherein said illumination devices are in electrical communication with said control module;

wherein said illumination means of said second jack further comprises a plurality of illumination devices disposed about an upper face perimeter edge of said second jack base;

wherein said illumination means of said third jack further comprises a plurality of illumination devices disposed about an upper face perimeter edge of said third jack base; and wherein said illumination means of said fourth jack further comprises a plurality of illumination devices disposed about an upper face perimeter edge of said fourth jack base.

* * * * *